Sept. 14, 1948.    F. L. WATROUS ET AL    2,449,261
THERMOSTATICALLY CONTROLLED MIXING VALVE
Filed Aug. 27, 1945    3 Sheets-Sheet 2
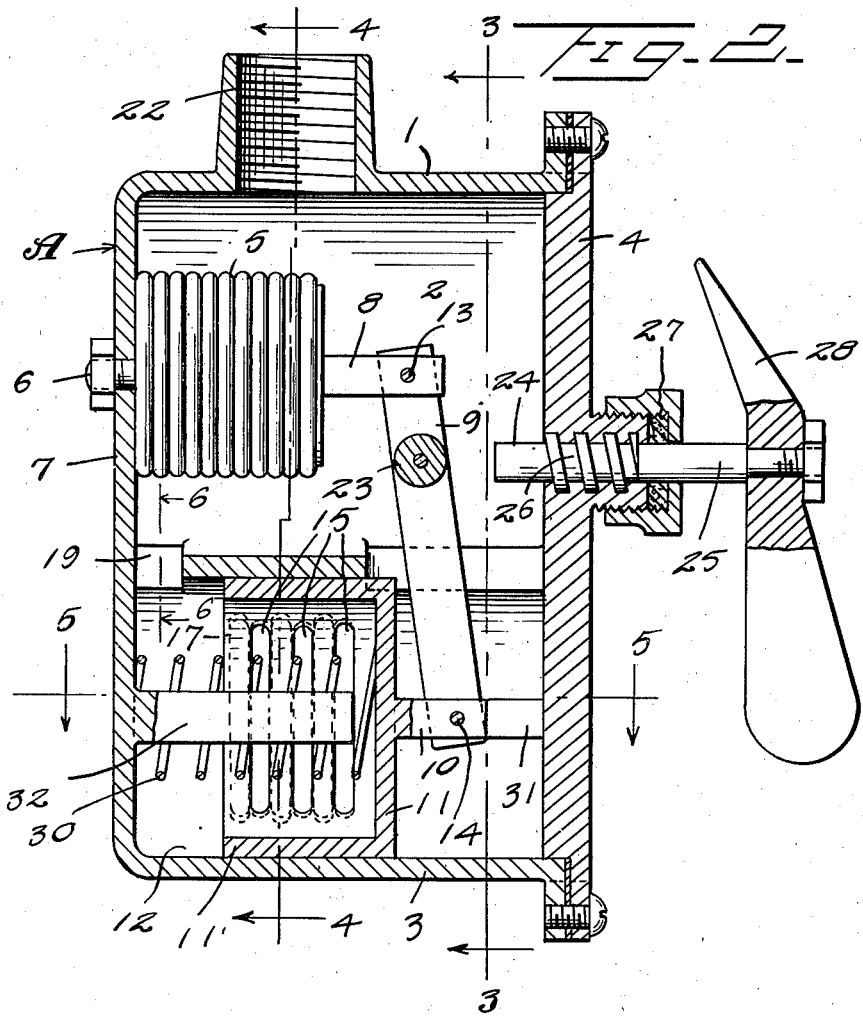
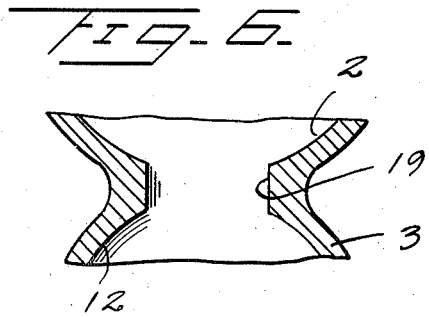
Inventors
F. L. Watrous
G. E. Manis
By
Attorney

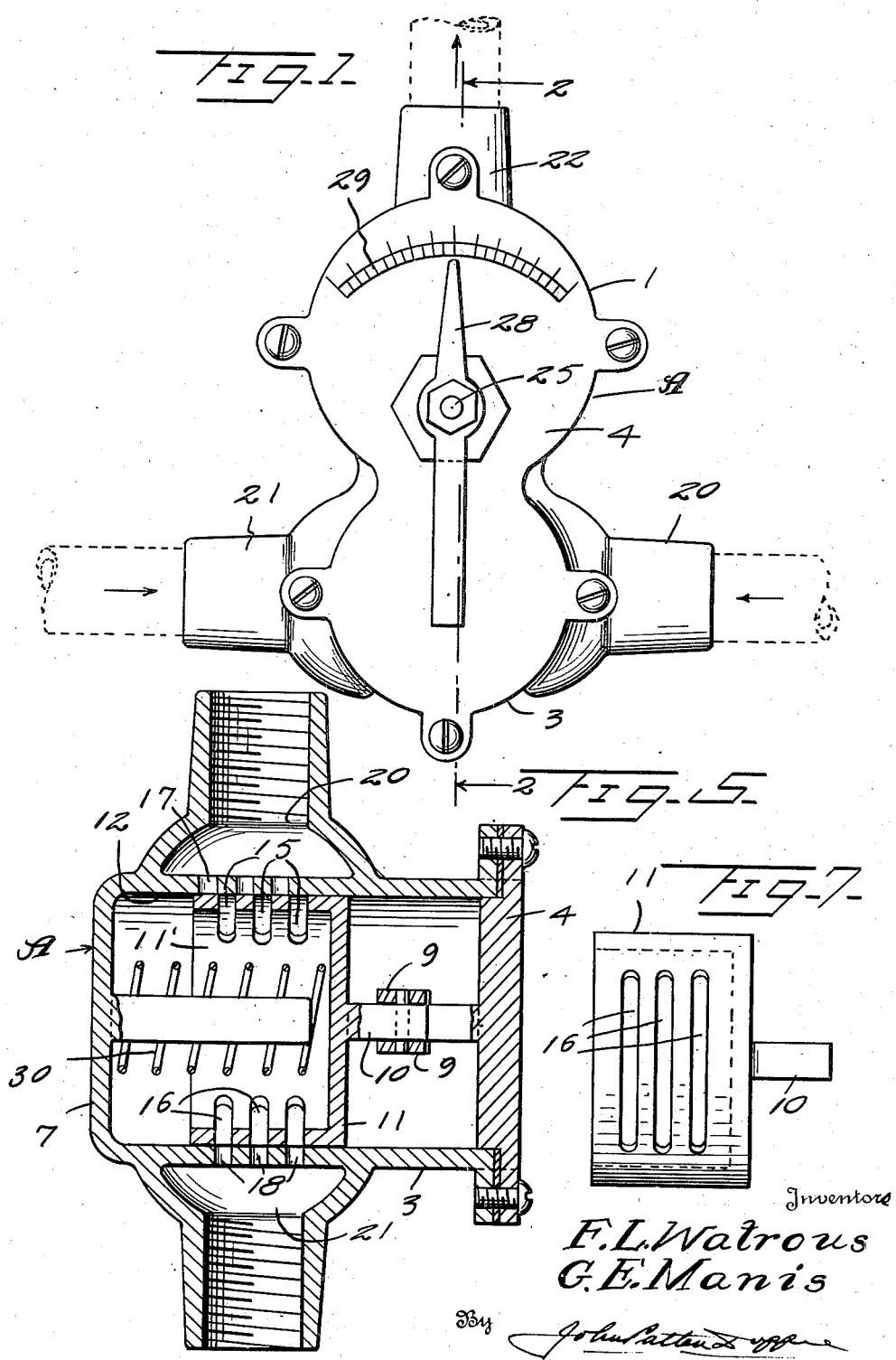

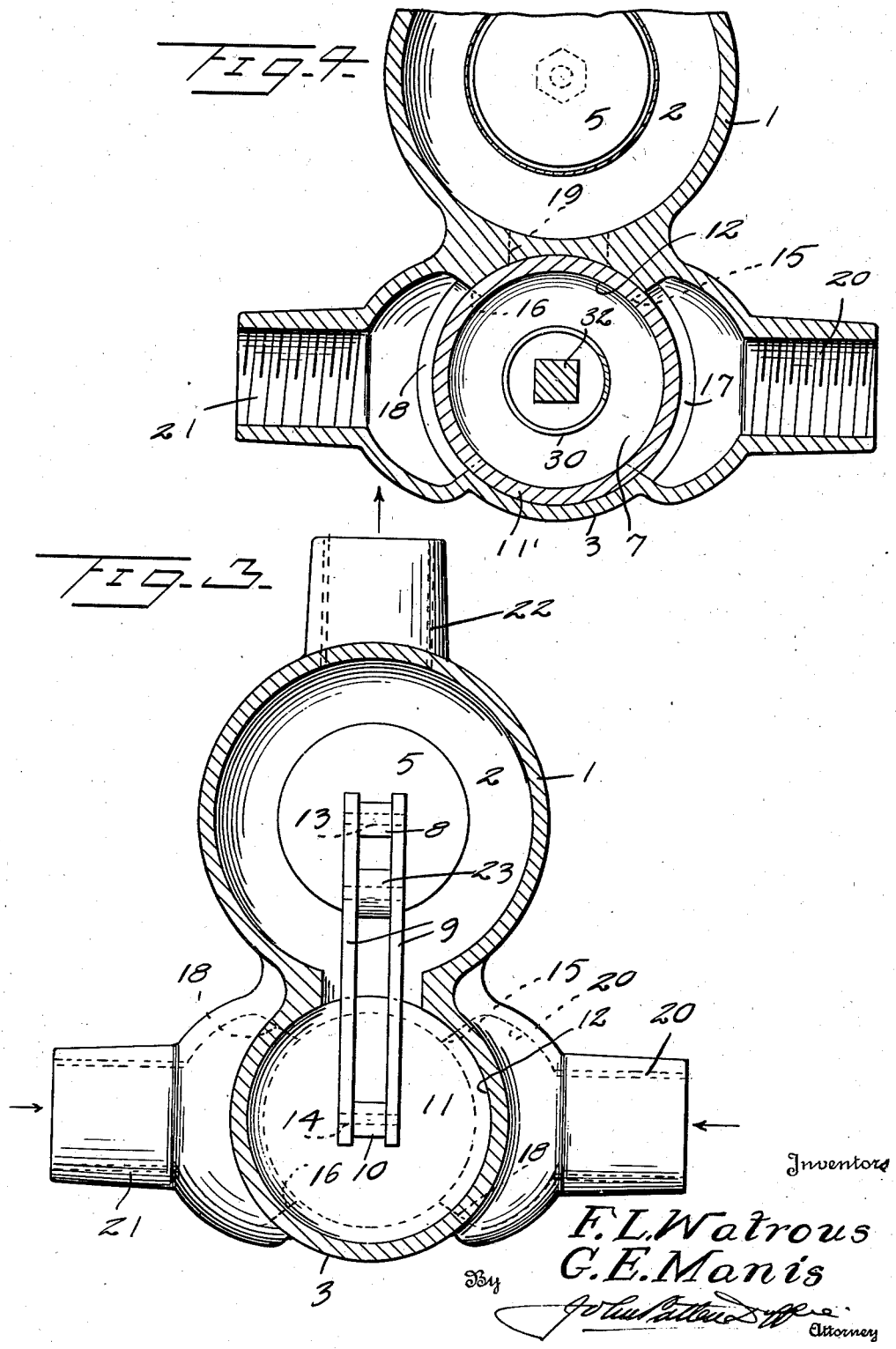

Patented Sept. 14, 1948

2,449,261

UNITED STATES PATENT OFFICE 2,449,261

THERMOSTATICALLY CONTROLLED MIXING VALVE

Floyd L. Watrous and George E. Manis, Huntington, Ind.

Application August 27, 1945, Serial No. 612,946

1 Claim. (Cl. 236—12)

This invention relates generally to thermostatically controlled mixing valves, and more particularly to that type of such valve in which the flow of the hot and cold water into the mixing chamber is controlled by the sliding movement of a hollow cylindrical piston valve, mounted to reciprocate in a corresponding piston valve chamber.

One object of our invention is to provide a thermostatically controlled mixing valve of the type specified, in which the hollow cylindrical piston valve is provided in opposite sides with perpendicularly disposed arcuate ports or slots adapted to register with corresponding slots formed in opposite sides of the valve chamber, but with the hot and cold water ports of the valve chamber arranged in alternating or staggered relation in such a way that when the hot water ports are open the cold water ports are closed, or vice versa, or whereby the opening and closing of the hot and cold water ports will be progressive in order that any percentage of hot and cold water may be obtained to maintain the desired predetermined temperature of the delivered stream.

A further object of our invention is to provide a thermostatically controlled mixing valve of the character specified, in which the movement of the piston valve in one direction, in commencing to close the hot water ports in the valve chamber and open the cold water ports, is controlled by an adjustable stop at the inner end of the pointer shaft and a link connection between the thermostat and the front end of the piston valve.

A still further object of our invention is to provide a thermostatically controlled mixing valve of the kind mentioned in which the hot and cold water ports are disposed in direct opposition at opposite sides of the piston chamber and the fluid mixture discharged and delivered at the top of the main body or casing.

With the foregoing and other objects in view that will appear as the nature of our invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a front elevation of a thermostatically controlled mixing valve, embodying our improvements.

Figure 2 is a vertical transverse section, taken on line 2—2 of Figure 1.

Figure 3 is a vertical transverse section, taken on line 3—3 of Figure 2.

Figure 4 is a similar view, taken on line 4—4 of Figure 2.

Figure 5 is a horizontal section, taken on line 5—5 of Figure 2.

Figure 6 is a detail fragmentary sectional view, taken on line 6—6 of Figure 2, and Figure 7 is a detail side elevational view of the piston valve.

Referring to the drawings for a more particular description of our invention, and in which drawings like parts are designated by like reference characters throughout the several views, the device essentially comprises the main body or casing A, consisting of the upper larger cylindrical portion 1, which forms the mixing chamber 2, and the lower integral cylindrical portion 3 of smaller diameter. The front of the casing A is provided with a removable cover 4 to provide for assembling the parts and to permit ready access to the interior of the device to facilitate any necessary repairs or replacements.

In carrying out our invention, the thermostat 5 is mounted in the mixing chamber 2 directly above the piston valve chamber and reciprocating valve and is bolted, as at 6, or otherwise fastened to the back wall 7 of the casing. The front end of the thermostat 5 is provided with a horizontal arm 8, which as shown, is freely connected by means of a pair of corresponding flat longitudinally spaced parallel links 9, to the horizontal arm 10, extending from the head 11 of a hollow cylindrical piston valve 11' adapted to slide or reciprocate backwardly and forwardly in the piston chamber 12, which is actually formed by the inner end of the lower smaller cylindrical portion 3 of the main body or casing A. The parallel links 9 may be freely connected to the arms 8 and 10 by the transverse pivot pins 13 and 14, or other equivalent means.

The piston valve 11' is provided in opposite sides with the perpendicularly disposed arcuate hot and cold water ports or slots 15 and 16, respectively, adapted to register with corresponding ports 17 and 18, formed in opposite sides of the wall of the piston valve chamber, and particular attention is invited to the fact that the ports 15 and 16 of the piston valve are arranged in alternating or staggered relation so that when the hot water ports 17 in the valve chamber are completely open, the cold water ports 18 are completely closed, or vice versa, and whereby the closing of one series of ports and opening of the other series will be progressive in order that any desired percentage of hot and cold water may be obtained. The mixture of hot and cold water passes upwardly through a vertical opening 19 in the top and rear portion of the wall of the valve chamber into the mixing chamber 2.

The hot and cold water inlets 20 and 21, respectively, are disposed in a horizontal plane directly opposite each other and communicate with opposite sides of the piston valve chamber, while the outlet 22 for the mixture of hot and cold water to be delivered at any suitable place, extends upwardly from the top of the main body or casing A.

The links 9 are provided near their upper ends with a fulcrum roller 23, which is mounted between the inner faces of said links, and under certain conditions hereinafter explained, is adapted to engage a horizontal stop 24 formed by the inner end of the shaft 25. The shaft 25 is formed with an exterior thread 26, which screws into the stuffing box 27 carried by the front cover 4 of the casing and a pointer 28 is suitably fastened to the outer end of the shaft 25 and works over the face of a graduated dial 29 on the cover.

In practice, with the parts in the position illustrated in Figure 2 of the drawings, when the water exceeds a certain predetermined temperature, which is regulated by the position of the pointer 28 on the graduated dial 29, the thermostat 5 in the mixing chamber 2 expands and moves the fulcrum roller 23 into contact with the inner end of the stop 24 and the roller 23 then acts as a fulcrum on which the lower ends of the parallel links 9 swing inwardly. At this stage in the operation of the device, the piston valve 11' commences to slide inwardly in the valve chamber, against the action of the coil spring 30 and in turn commences to close the hot water ports 17 and open the cold water ports 18 in opposite sides of the valve chamber, and this result is accomplished by virtue of the alternating or staggered relation of the hot and cold water ports 15 and 16 in opposite sides of the piston valve 11'.

If the temperature of the water in the mixing chamber drops or falls below the desired predetermined point, the thermostat will contract and the reverse action will take place, as will be apparent.

The outward movement of the lower ends of the parallel links is limited by the horizontal lug or stud 31 projecting inwardly from the inner face of the front cover 4 in the path of movement of said links.

The coil spring 30 is disposed around the horizontal shaft 32 extending inwardly from the inner face of the back wall 7 of the casing A. One end of this spring bears against the back wall 7 and its opposite end bears against the inner face of the head 11 of the piston valve 11'.

The constant temperature of the hot and cold water mixture delivered through the outlet 22 is regulated by adjusting the stop 24 through the movement of the pointer 28 which travels over the face of the graduated dial.

From the foregoing description taken in connection with the drawings, it is thought that the construction, operation and advantages of our invention will be readily understood, without requiring a more extended explanation.

Various changes in the form, proportions and minor details of construction may be resorted to without departing from the principles or sacrificing any of the advantages of our invention, as defined in the appended claim.

Having described our invention, what we claim as new and desire to secure by Letters Patent is:

In a thermostatically controlled mixing valve of the character specified, a casing comprising upper and lower communicating cylindrical sections of larger and smaller diameter, respectively, said upper section forming a mixing chamber and said lower section a valve chamber and said valve member formed in opposite sides with circumferential ports or openings, a thermostat mounted in the mixing chamber, a hollow cylindrical reciprocating piston valve, slidably mounted in the valve chamber and formed in opposite side walls with a series of circumferential inlet ports or openings adapted to register with corresponding ports or openings in opposite sides of the valve chamber, with the two series of ports of the piston valve arranged in alternating or staggered relation, parallel links between the thermostat and piston valve, a roller carried between the upper ends of said parallel links, an adjustable stop disposed in the path of movement of said roller, a coil spring normally holding the piston valve in forward position and tending to resist the inward stroke of said valve, said roller adapted to engage the aforesaid stop when the thermostat expands and acts as a fulcrum on which the lower ends of the links swing inwardly, horizontal oppositely disposed hot and cold water inlets communicating with opposite sides of the valve chamber and an outlet at the top of the casing for the water to be delivered.

FLOYD L. WATROUS.
GEORGE E. MANIS.

REFERENCES CITED

The following references are of record in the file of this patent:

UNITED STATES PATENTS

| Number | Name | Date |
| --- | --- | --- |
| Re. 19,488 | Russell | Mar. 5, 1935 |
| 841,817 | Ricketts | Jan. 22, 1907 |
| 1,715,662 | Laskey | June 4, 1929 |
| 2,014,526 | Henning | Sept. 17, 1935 |

FOREIGN PATENTS

| Number | Country | Date |
| --- | --- | --- |
| 26,525 | Great Britain | 1904 |